United States Patent [19]

Verburgh et al.

[11] 4,317,850
[45] Mar. 2, 1982

[54] METHOD FOR APPLYING A DENSE, HARD, ADHESIVE AND WEAR-RESISTANT LAYER OF CERMETS OR CERAMIC MATERIAL ON A METAL OBJECT

[75] Inventors: Martin B. Verburgh, Amersfoort; Hans B. van Nederveen, Bilthoven, both of Netherlands

[73] Assignee: SKF Industrial Trading and Development Company B.V., Nieuwegein, Netherlands

[21] Appl. No.: 167,038

[22] Filed: Jul. 9, 1980

[30] Foreign Application Priority Data

Aug. 3, 1979 [NL] Netherlands .......................... 7905973

[51] Int. Cl.³ .......................... B05D 3/12; B05D 1/10
[52] U.S. Cl. .................................. 427/370; 427/376.3; 427/383.9; 427/423; 264/60
[58] Field of Search ................ 427/154, 34, 423, 369, 427/370, 226, 383.9, 156, 376.3; 428/568, 569; 156/344; 264/60, 81, 316, 317, 325, 332; 75/240, 242; 249/116

[56] References Cited

U.S. PATENT DOCUMENTS

| | | | |
|---|---|---|---|
| 2,861,900 | 11/1958 | Smith et al. | 427/423 |
| 2,964,420 | 12/1960 | Poormon et al. | 427/423 X |
| 3,393,090 | 7/1968 | Barraco | 427/370 X |
| 4,023,966 | 5/1977 | Loersch et al. | 264/332 X |

FOREIGN PATENT DOCUMENTS 1451113  9/1976  United Kingdom .

Primary Examiner—John D. Smith
Assistant Examiner—Bernard F. Plantz
Attorney, Agent, or Firm—Eugene E. Renz, Jr.

[57] ABSTRACT

A method for applying a dense, hard, adhesive and wear-resistant layer of cermets or cermic material on a metal object. A mixture of the hard cermet or ceramic material with a bonding metal is sprayed onto the metal object. A gas-tight metal foil is applied over the sprayed on coating and the metal foil and sprayed on coating are isostatically compressed onto the metal object. The metal foil is removed leaving a dense, hard, wear-resistant layer of cermets or ceramic material and bonding metal.

15 Claims, 1 Drawing Figure

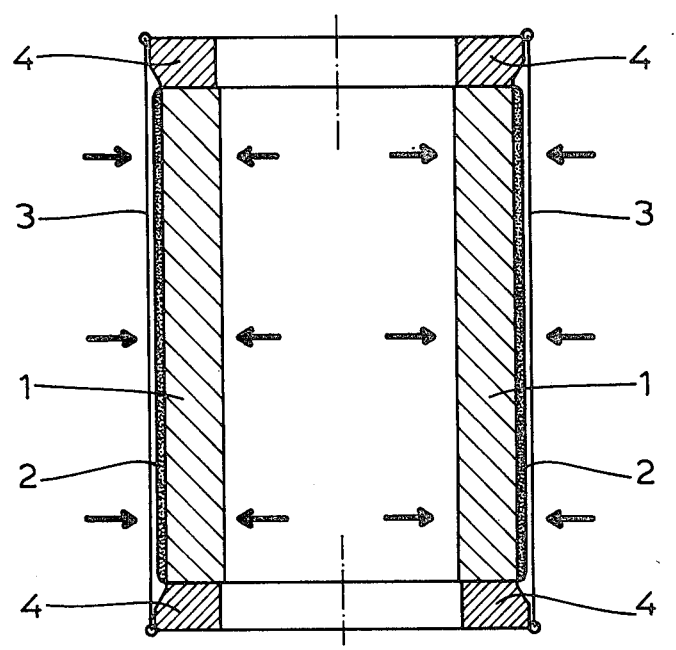

METHOD FOR APPLYING A DENSE, HARD, ADHESIVE AND WEAR-RESISTANT LAYER OF CERMETS OR CERAMIC MATERIAL ON A METAL OBJECT

A method for applying a dense, hard, adhesive and wear-resistant layer of cermets or ceramic material on metal objects is described.

The invention relates to a method for applying a dense, hard, solid and wear-resistant layer of cermets or ceramic material on a metal object by spraying a mixture of hard particles of cermets or ceramic material and a bonding metal onto the metal object, followed by compression of the sprayed-on layer at high temperature and pressure, to obtain the coated metal objects of the invention.

Such a method is disclosed in British Pat. No. 1,451,113, which describes spray coating a metal object with a layer of a metal or alloy, which may contain ceramic materials or so-called cermets. Such spray coating of powdery materials, which are usually applied by flame or plasma spraying, produces a porous layer. The adhesion of such a porous layer to the underlying metal insufficient in many cases. To obviate this problem, pursuant to the British patent, the porous layer is compressed by melting the bonding metal present therein in a vacuum, whereby the porosity is kept to a minimum.

It is noted that French Pat. No. 1,434,158 relates to a method for the application of, for example, a layer of nickel-chromium alloy on graphite as substrate material, after which an aluminum layer is applied. Application of the layers is effected by spraying on the substrate. The whole is isostatically compressed while particles of graphite, provided by a metal layer which is not porous and which is water-tight, are supplied. In this process, the isostatic compaction is carried out cold.

The present invention resides in an improvement on the method of the prior art described above characterized by applying a gas-tight metal foil over the sprayed-on layer. The resulting structure is then isostatically compressed at a pressure of between about 500 and about 2000 bar, at a temperature between about 500° and about 2000° C., for a period from about one-half hour up to about eight hours, after which the metal foil is removed.

The method of the present invention provides metal objects in which the applied layer has a high density and greatly improved adhesion to the underlying metal.

The method of the invention may be successfully used for the application of a dense, hard, adhesive and wear-resistant layer on metal objects of varying surface structure, namely, from a simple plain structure to complicated or fancy surface structures.

A particularly great advantage of the present method is that it permits compression of hollow bodies, in particular pipes, to take place with no variation in diameter over the length of the pipe. Therefore, the present method is particularly suitable for the application of a dense, hard, adhesive and wear-resistant layer of cermet or ceramic material on metal pipes, which may then, after compression, be used without special subsequent processing, for example as bearing bushings, since the diameter over the length of the bushing does not vary.

When compression of the sprayed-on layer is performed pursuant to the invention, there is obtained a pipe with a diameter which may be reproduceably controlled, depending upon the thickness of the sprayed-on layer and the pressure at which compression is effected.

Pursuant to the invention, prior to the application of a gas-tight metal foil, $Al_2O_3$ preferably is sprayed on the previously coated surface. The $Al_2O_3$ serves as a diffusion barrier and also prevents the formation of a bond between the metal foil and the coating. In this way, the metal foil can be stripped away easily after compression of the underlying coating. Omission of $Al_2O_3$ results in a more secure bond between the underlying coating and the metal foil, precluding ordinary stripping. In this case the metal foil must be removed either by mechanical means, such as scouring, or by chemical means, such as by applying a solution capable of etching the metal foil.

The metal foil is suitably a gas-tight foil having a thickness of less than about 0.5 mm, usually 0.1, 0.15 or 0.2 mm. Suitable metal foils include those of stainless steel or non-alloy steel $C_{15}$. The foil to be applied must withstand the temperature and pressure applied. Therefore, the melting point of the metal from which the foil is made must lie somewhat above the processing temperature, and the metal must not break down during processing due to the temperature and pressure of processing. Suitable foils include, without limitation, those of aluminum, copper, or any other suitable metal, depending upon the conditions under which compression takes place.

The method of the invention is particularly suitable for applying a layer of a cermet of tungsten carbide with cobalt, applied to a forged, cast or a sintered core, or a similar substrate material. Cermets of other metals, or other ceramic materials, for example titanium carbide (TiC) or silicon nitride ($Si_3N_4$), are also very suitable as the wear-resistant material. The bonding metal may suitably be a metal or an alloy consisting predominantly of Ni, Co, Fe or Cr. Cobalt, and alloys of cobalt and nickel (Co/Ni) are especially suitable as the bonding metal. The most advantageous selection naturally also depends upon the substrate material used, to which the applied layer must adhere well.

The layer is applied by spraying a powdered mixture of the bonding metal and the wear-resistant particles, in the proportion desired for the layer. This spraying may be effected in the customary fashion, for example by flame-spraying or plasma spraying, which in either case, provide a porous layer on the substrate. The objects may be coated entirely or only partially with the sprayed-on layer. Depending upon the desired layer thickness, the coating material will be applied in one or a plurality of layers. If desired, the successive layers may be of different compositions.

If desired, the surface of the applied coating may be smoothed mechanically after coating. This is not necessary in most cases, however, since the roughness of the surface after compression, is determined chiefly by the particle size of the pressure-transmitting medium. By selecting the correct particle size of that medium, the surface will be sufficiently smooth in most cases without subsequent processing. A particle size of about 0.10 to about 0.25 mm is very satisfactory for most applications.

In a preferred embodiment of the invention, a mixture containing at least about 70% by weight of cermet particles, and preferably a mixture consisting of about 83–94% by weight tungsten carbide, is employed, the remainder being cobalt.

The thermal expansion coefficients of cermets or ceramic materials differ considerably from those of metals. To prevent the applied layers from springing loose as a result of thermal stresses during cooling at the end of the compression process, it is advisable and preferred to allow the content of cermets or ceramic materials to vary in the direction of depth of the coating by applying the coating in two or more stages or layers, varying the proportion of bonding metal in the consecutively sprayed-on layers.

The invention also relates to metal objects which are wholly or partially coated with a dense layer consisting of a bonding metal and cermet particles or ceramic materials as the wear-resistant material, and which are characterized in that the dense coating layer consists of at least about 70% by weight of the hard particles, the remainder being of bonding metal.

The invention alternatively relates to similar metal objects, the applied coating of which consists of about 83-94% by weight of cermet particles, particularly tungsten carbide, the remainder being cobalt bonding metal. In particular, the invention further relates to objects of the aforesaid type, wherein the coating consists of about 83-94% by weight tungsten carbide and about 17-6% by weight cobalt.

The invention likewise comprises objects of this general type wherein in the applied hard layer the content of bonding metal varies with the distance to the ground or substrate metal and in particular on similarly coated objects, wherein the content of bonding metal in the layer decreases with increasing distance to the ground material.

The invention will now be described in greater detail by reference to the FIGURE.

The FIGURE represents a preferred embodiment pursuant to the invention, wherein a layer or coating 2 is sprayed on a metal pipe 1 as the substrate.

After spray application of the coating 2, clamp members 4 are fastened to the outer ends of the pipe. The clamp members 4 serve to stretch the metal foil 3 right above the sprayed-on coating 2. The assembly is then transferred to a hot isostatic press and heated therein to the compression temperature, which is at least about 500° C. Depending upon the substrate material used, the type of coating, and the type of metal foil, the processing temperature may lie between about 500° and about 2000° C. The temperature during this process is always such that compression itself proceeds with the coating in the solid phase. At this temperature the bonding metal is not melted, but sintering does occur. At the same time as the temperature is raised, or after the desired temperature has been reached, the gas pressure in the press is raised to at least 500 bar. The pressure may lie between 500 and 2000 bar. The foil is thereby pressed against the sprayed-on layer 2. As a result of this temperature and pressure the layer 2 is compressed, thus forming a diffusion bond with the substrate material 1. This process requires at least one-half hour, counting from the time when the compression temperature is reached to the beginning of cooling. The time required for processing, however, may lie between about eight hours and the one-half hour minimum. After this the temperature and pressure are again allowed to return to ambient values and the object is withdrawn from the press, after which the foil is removed.

In the event that the outermost layer of the sprayed-on layer 2 is $Al_2O_3$, the foil 3 may easily be stripped off, because $Al_2O_3$ acts as a so-called diffusion barrier between the underlying layer and the foil, the foil resting loose on the layer and not adhering to the coating.

If no $Al_2O_3$ is used, removal of the foil is more laborious, since a bond is effected between the foil 3 and the sprayed-on layer 2. In this case the foil 3 is removed, preferably by chemical means, for example, by etching, or scouring.

After removal of the clamp members 4, a coated pipe is obtained having a diameter which is almost uniform everywhere over the length of the pipe and which is, therefore, extremely suitable as bearing bushing.

It is self-evident that the invention is not limited to the embodiment represented in the FIGURE.

We claim:

1. In a method for applying a dense, hard, adhesive and wear-resistant layer of cermets or ceramic material on a metal object by spray coating said object with a mixture of hard cermet or ceramic particles with a bonding metal, and compressing said coating on said object, the improvement which comprises:
   (a) applying a gas-tight metal foil over the sprayed-on coating;
   (b) isostatically compressing the metal foil and the sprayed-on coating onto said metal object under a pressure in the range from about 500 to 2000 bar, at a temperature within the range from about 500° to about 2000° C. for a period from about one-half hour up to about eight hours, said temperature being below the melting point of said bonding metal but high enough to sinter said coating; and
   (c) removing said metal foil; whereby a dense, hard wear-resistant layer of cermets or ceramic material and bonding metal is strongly diffusion bonded on said metal object.

2. The method of claim 1 wherein $Al_2O_3$ is sprayed on said coating prior to application of said foil.

3. The method of claim 1 wherein the metal foil has a thickness in the range from about 0.1 to about 0.2 mm.

4. The method of claim 1 wherein the metal foil is aluminum foil.

5. The method of claim 1 wherein the metal foil is non-alloy steel.

6. The method of claims 1 or 2 wherein the metal foil is removed by mechanical means.

7. The method of claims 1 or 2 wherein the metal foil is removed by scouring.

8. The method of claim 1 wherein the metal foil is removed by chemical means.

9. The method of claim 8 wherein the chemical means is etching.

10. The method of claim 1 wherein the wear-resistant particles are cermets.

11. The method of claim 1 wherein the wear-resistant particles are ceramic.

12. The method of claim 1 wherein the sprayed-on coating contains at least about 70% cermet particles by weight.

13. The method of claim 12 wherein the cermet comprise tungsten carbide.

14. The method of claim 13 wherein the cermet comprises about 83 to about 94% tungsten carbide by weight, the remainder being cobalt.

15. The method of claims 1 or 2 wherein the coating is applied in a plurality of successive applications and the proportion of bonding metal in said successive applications is varied to avoid disruption of said layers by differences in the coefficients of expansion thereof.

* * * * *